US009502024B2

(12) United States Patent
Pickering et al.

(10) Patent No.: US 9,502,024 B2
(45) Date of Patent: Nov. 22, 2016

(54) METHODS, APPARATUS AND COMPUTER PROGRAMS FOR AUTOMATIC SPEECH RECOGNITION

(71) Applicant: Nuance Communications, Inc., Burlington, MA (US)

(72) Inventors: John Brian Pickering, Winchester (GB); Timothy David Poultney, Southampton (GB); Benjamin Terrick Staniford, Wallasey (GB); Matthew Whitbourne, Horndean (GB)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/191,176

(22) Filed: Feb. 26, 2014

(65) Prior Publication Data
US 2014/0249816 A1 Sep. 4, 2014

Related U.S. Application Data

(63) Continuation of application No. 11/255,201, filed on Oct. 20, 2005, now Pat. No. 8,694,316.

(30) Foreign Application Priority Data

Dec. 1, 2004 (GB) .................................. 0426347.1

(51) Int. Cl.
*G10L 15/00* (2013.01)
*G10L 15/08* (2006.01)
(52) U.S. Cl.
CPC .......... *G10L 15/08* (2013.01); *G10L 2015/085* (2013.01)
(58) Field of Classification Search
CPC .......... G10L 15/22; G10L 2015/0631; G10L 15/063; G10L 15/32; G10L 13/08; G10L 15/08; G10L 15/083; G10L 15/187; G10L 2015/085; G10L 15/065; G10L 15/1822; G10L 15/19; G10L 15/30; G06F 3/16

USPC .......... 704/231, 251, 235, 270, 270.1, 275, 704/254, 256, 243, 244, 248
See application file for complete search history.

(56) References Cited

U.S. PATENT DOCUMENTS 5,566,272 A   10/1996   Brems et al.
5,638,425 A    6/1997   Meador et al.
(Continued)

FOREIGN PATENT DOCUMENTS

CN   1115902 A   1/1996
CN   129 3428 A   5/2001

OTHER PUBLICATIONS

Chinese Office Action issued Apr. 3, 2009 in connection with Chinese Application No. 200510114906.7.

*Primary Examiner* — Abdelali Serrou
(74) *Attorney, Agent, or Firm* — Wolf, Greenfield & Sacks, P.C.

(57) ABSTRACT

An automatic speech recognition (ASR) system includes a speech-responsive application and a recognition engine. The ASR system generates user prompts to elicit certain spoken inputs, and the speech-responsive application performs operations when the spoken inputs are recognized. The recognition engine compares sounds within an input audio signal with phones within an acoustic model, to identify candidate matching phones. A recognition confidence score is calculated for each candidate matching phone, and the confidence scores are used to help identify one or more likely sequences of matching phones that appear to match a word within the grammar of the speech-responsive application. The per-phone confidence scores are evaluated against predefined confidence score criteria (for example, identifying scores below a 'low confidence' threshold) and the results of the evaluation are used to influence subsequent selection of user prompts. One such system uses confidence scores to select prompts for targetted recognition training—encouraging input of sounds identified as having low confidence scores. Another system selects prompts to discourage input of sounds that were not easily recognized.

14 Claims, 6 Drawing Sheets

(56) References Cited

U.S. PATENT DOCUMENTS

| | | | |
|---|---|---|---|
| 5,895,447 A | 4/1999 | Ittycheriah et al. | |
| 5,911,485 A * | 6/1999 | Rossmann | G06F 3/0237 341/20 |
| 5,963,903 A | 10/1999 | Hon et al. | |
| 6,064,959 A * | 5/2000 | Young et al. | 704/251 |
| 6,088,669 A | 7/2000 | Maes | |
| 6,107,935 A | 8/2000 | Comerford et al. | |
| 6,192,337 B1 | 2/2001 | Ittycheriah et al. | |
| 6,405,170 B1 * | 6/2002 | Phillips | G10L 15/22 379/88.02 |
| 6,601,027 B1 * | 7/2003 | Wright et al. | 704/235 |
| 6,601,029 B1 | 7/2003 | Pickering | |
| 7,103,542 B2 | 9/2006 | Doyle | |
| 7,117,159 B1 | 10/2006 | Packingham et al. | |
| 7,146,383 B2 | 12/2006 | Martin et al. | |
| 7,228,278 B2 | 6/2007 | Nguyen et al. | |
| 7,412,393 B1 | 8/2008 | De Fabbrizio et al. | |
| 7,415,415 B2 * | 8/2008 | Clelland | G10L 15/222 379/88.01 |
| 7,493,257 B2 * | 2/2009 | Kim | G10L 15/22 704/231 |
| 7,526,431 B2 | 4/2009 | Roth et al. | |
| 7,640,190 B1 * | 12/2009 | Sullivan | G06Q 30/0601 379/114.01 |
| 7,864,987 B2 | 1/2011 | Venkatanna et al. | |
| 8,694,316 B2 | 4/2014 | Pickering et al. | |
| 2002/0065651 A1 * | 5/2002 | Kellner | G06F 17/28 704/231 |
| 2002/0087311 A1 * | 7/2002 | Leung Lee et al. | 704/251 |
| 2002/0120447 A1 | 8/2002 | Charlesworth et al. | |
| 2003/0004717 A1 | 1/2003 | Strom et al. | |
| 2003/0229492 A1 | 12/2003 | Nolan | |
| 2003/0236664 A1 * | 12/2003 | Sharma | 704/251 |
| 2004/0024601 A1 * | 2/2004 | Gopinath et al. | 704/270 |
| 2004/0094388 A1 * | 5/2004 | Van Liempd et al. | 198/370.08 |
| 2005/0010412 A1 | 1/2005 | Aronowitz | |
| 2005/0080628 A1 * | 4/2005 | Kuperstein | H04M 3/4938 704/270.1 |
| 2005/0154591 A1 * | 7/2005 | Lecoeuche | 704/270.1 |
| 2005/0238207 A1 | 10/2005 | Tavares | |
| 2006/0009980 A1 * | 1/2006 | Burke et al. | 704/270 |
| 2006/0041756 A1 | 2/2006 | Ashok et al. | |
| 2006/0074651 A1 * | 4/2006 | Arun | 704/233 |
| 2006/0074670 A1 * | 4/2006 | Weng et al. | 704/257 |
| 2006/0143015 A1 | 6/2006 | Knott et al. | |
| 2006/0206330 A1 * | 9/2006 | Attwater | G10L 15/08 704/252 |
| 2008/0101658 A1 | 5/2008 | Ahern et al. | |
| 2008/0208586 A1 | 8/2008 | Ativanichayaphong et al. | |

* cited by examiner

METHODS, APPARATUS AND COMPUTER PROGRAMS FOR AUTOMATIC SPEECH RECOGNITION

RELATED APPLICATIONS

This Application claims the benefit under 35 U.S.C. §120 of U.S. application Ser. No. 11/255,201, entitled "METHODS, APPARATUS AND COMPUTER PROGRAMS FOR AUTOMATIC SPEECH RECOGNITION" filed on Oct. 20, 2005. Foreign priority benefits are claimed under 35 U.S.C. §119(a)-(d) or 35 U.S.C. §365(b) of British application number 0426347.1, filed on Dec. 1, 2004. Each of these applications is incorporated herein by reference in its entirety.

FIELD OF INVENTION

The present invention provides methods, apparatus and computer programs for automatic speech recognition.

BACKGROUND

An automatic speech recognition (ASR) system takes an audio signal as input and typically compares the input signal with known sounds (phones) and sequences of sounds (paths) of an acoustic model (AM) to identify words that appear to match a spoken sequence of sounds. After identifying a word or words corresponding to an input audio signal, a text or other machine-readable representation of the identified matching words may be returned by the ASR to an application program such as an interactive voice response (IVR) telephony application. A confidence score may be returned with each apparently-matching word, the confidence score being based on the closeness of an incoming acoustic segment to the mean of a probability distribution associated with a phone within the ASR system's acoustic model. A number of possible words and their respective confidence scores may be returned for selection or further analysis.

Typical automatic speech recognition (ASR) systems require a considerable amount of training data for a single user (speaker dependent) or multiple users (speaker independent) to enable the ASR system's recognition engine to learn to associate the acoustic input with the corresponding sounds ('phone labels') of the language. When deployed in a real application, such as an automated telephony service, the sequence of sounds that the ASR system identifies must also be matched against an application-specific grammar, which predefines words and phrases that are expected. If the ASR system is trained on enough data and if the grammar covers all possible words and phrases, then recognition accuracy can be very high. However, individual sounds within a given language may be easily confused, such as "F" and "S" in English. Such sounds may well appear within the words in the application grammar. In such cases, recognition accuracy will tend to decrease.

It is common practice in most automated services using ASR to ask the user to confirm whether or not the ASR result is correct. If no result was returned, callers could be asked to repeat words that are not recognized. For example, a caller may speak the name of a person they wish to contact "Stephen James". If the synthesized voice response includes a different name, such as "Did you say "Peter Jones"?", the caller is unlikely to be impressed. Having to repeat their input may also annoy callers. Even if the confirmation is just "Yes" or "No", the ASR system may confuse the two items—in particular because a user prompt such as "Did you say Stephen James?" could be answered with "yeah", "OK", "correct", or "nope", "nah" and so forth.

SUMMARY

A first aspect of the present invention provides a method for controlling operation of an automatic speech recognition (ASR) system. During a 'conversation' with a user, the ASR system generates user prompts to elicit required inputs from the user. Sounds within an input audio signal are compared with phones within an acoustic model to identify candidate matching phones. Recognition confidence scores are calculated for the individual candidate matching phones, and the recognition confidence scores are evaluated to identify one or more of the candidate matching phones having a predefined recognition confidence characteristic (for example, identifying candidate phones having high or low confidence scores). The method includes selecting a user prompt for eliciting a subsequent user input, wherein the selection is dependent on the recognition confidence characteristic of the identified one or more phones.

A typical ASR system in the context of this specification includes a speech recognition engine and an application program, and may include other components as described below. User prompts in the context of this specification are prompts that are presented to users to elicit user inputs. For example, a question may be presented to the user by playing an audio prompt (such as a stored audio clip or a dynamically generated, simulated voice message) or by displaying text on a computer screen. Each user prompt encourages the user to speak, for example to make selections from a menu of options or to specify the person or service that the user wants.

In a first embodiment of the invention, sequences of phones that are identified as possible matches to the sounds of the input audio signal are compared with words in a speech recognition grammar (such as an application-specific grammar of an IVR application) to identify candidate matching words. The confidence scores of the individual phones, within a sequence of phones that appear to match a word in the application grammar, are combined to form a cumulative confidence score for evaluating the most likely word matches. In one embodiment, if the recognition confidence scores for any individual phones within the matched words are below a defined threshold (low confidence), subsequently generated user prompts are modified to try to resolve the problem.

In another embodiment, the identification of candidate matching phones having predefined recognition confidence characteristics includes identifying phones having a recognition confidence above a defined threshold (high confidence) and prompting a user to input high confidence phones to avoid or overcome speech recognition problems.

Thus, confidence scores can be used to determine which areas of language the ASR program was unable to recognize with high confidence. Confidence scores can also show which user prompts result in low recognition confidence scores because phone-specific confidence scores can be evaluated and recorded in association with the prompts that elicited the spoken inputs. Subsequently, a process for generating a user prompt takes account of the per-phone confidence scores as well as per-word (i.e. phone sequence) confidence scores to adapt its user prompts for improved speech recognition. The user prompts may be selected for the purpose of targetted speech recognition training—generating prompts which invite input of phones having low recognition confidence scores. Alternatively, user prompts may be selected to encourage users to input words or phrases other than the words that were difficult to recognize—attempting to avoid phones having low recognition confidence by inviting users to input alternative words.

In many interactions between a caller and an ASR system, a first user input is required for a first application operation and a subsequent user input is required for a second application operation. One method according to the invention evaluates confidence scores associated with apparent matches between sounds within the first user input and phones within an acoustic model of the ASR system and then, in response to the confidence scores, controls the application's generation of user prompts associated with the subsequent required user input. The first and second application operations may be any two distinct operations of an application program, such as successive selection steps from an hierarchical menu in which the first and subsequent user inputs are used to indicate choices from the menu.

As mentioned above, one embodiment selects user prompts that are expected to encourage input of phones that were previously identified as having low recognition confidence scores—tailoring the ASR system's generated user prompts for targetted recognition training. The selection of user prompts can be implemented dynamically during the course of a normal user interaction with the ASR system, without requiring a dedicated caller-specific training period. User prompts can be modified for each successive step of a functional interaction between a caller and an ASR system. Because the caller is allowed to progress to the next successive step, this approach may be more efficient as well as less frustrating for callers than if the caller is asked to repeat an earlier input. One solution invites caller inputs that combine a word that includes a low confidence phone with one or more words that were previously recognised with high confidence.

Also mentioned above is an embodiment of the invention in which the ASR system selects a user prompt that is expected to encourage input of words having high confidence matching scores, or to discourage input of phones having low confidence matching scores. For example, an application program within the ASR system may respond to a low-confidence recognition score from the ASR system's recognition engine by selecting a user prompt that specifies, as the required user input, a synonym or other alternative to a word previously recognized with low confidence. For example, if a caller's 'Yes/No' inputs are difficult to recognize (low confidence matching scores), the caller may be prompted to say 'Correct' instead of 'Yes' while keeping the remainder of the user prompt unchanged.

Other customizations of user prompts may be implemented. In another example, low confidence scores may trigger replacement of a user prompt (such as "If <ConditionA>, say 'Yes'" or "Which service do you require?") with a more specific conditional instruction (such as "If <ConditionA>, say 'Yes please' and if <ConditionB> say 'No'") to invite a more specific response from callers. The above-described selections, modifications and customizations of user prompts are all referred to herein as 'selection' of a user prompt.

In another embodiment, a recognition grammar may be restructured or a recognition engine may be optimised in response to the evaluated recognition performance. Such changes to an application grammar may be based on phone confidence scores evaluated over a period of time and for multiple callers. Thus, the invention may be implemented to capture information about real and potential sound confusions and may use the information to modify and adapt the performance of the ASR system. Confidence score patterns can be used to generate recommendations for changing an acoustic model (by targetted training as described above), or changing an application grammar using a synonym dictionary.

A second aspect of the invention provides an automatic speech recognition (ASR) system comprising an application program and a speech recognition engine, wherein the speech recognition engine includes program code for evaluating recognition confidence scores associated with apparent matches between input sounds and phones in an acoustic model. In response to the confidence scores, the ASR system controls the generation of user prompts for influencing user inputs to the application program. The application is preferably a speech-responsive application which selects user prompts based on recognition confidence calculations of the recognition engine, but the speech recognition engine may output text words which are input to the application program as text.

In one embodiment, the ASR system includes an acoustic front end (AFE) for receiving an audio signal from an input device, removing noise, identifying the parts of the audio signal containing speech, and parameterizing sections of the identified speech. A speech recognition engine receives inputs from the AFE and compares the received inputs with an acoustic model with reference to an application grammar (a database of significant words) and a baseform pool (a database of phones comprising known ways of speaking words or word sequences). The recognition engine outputs results comprising candidate matching paths between states of the acoustic model, a word or words from the application grammar corresponding to each candidate path, and confidence scores calculated for phones and paths.

A further aspect of the invention comprises a method for calculating the confusability between sounds within the acoustic model of the ASR system. The confusability between two phones is based on a distance between the respective probability distributions associated with sounds within the acoustic model. A smaller distance is interpreted as meaning that two sounds will be more readily confused than sounds for which the distance is greater. The calculation of inherent confusability may be based on, for example, a Euclidean distance between the means of the probability distributions of any two sounds within the acoustic model taking into account the variance of the distributions.

A calculated inherent confusability such as described above can be combined with dynamically calculated recognition confidence scores (based, for example, on closeness of an incoming acoustic segment to the mean of the probability distribution for a sound within the acoustic model). The results can be used when interrogating an application grammar to determine whether there are confusable words in the grammar which are relevant to a set of candidate matching phones. The combination of inherent confusability and dynamically calculated confidence scores can provide an improved evaluation of recognition confidence and improve selection of user prompts to enhance recognition.

Embodiments of the invention may be used to modify the words in an application grammar to avoid possible confusions between items in the grammar. Calculations of inherent confusability between sounds in an acoustic model can be multiplied by runtime recognition confidence scores to identify recognition difficulties, and then problematic words in the grammar (those that are highly confusable in the application environment) can be replaced with synonyms that are not as likely to be confused.

Methods as described above may be implemented using computer program code, such as within an ASR system. Such program code may be made available as a set of one or more computer program products or modules comprising program code recorded on a recording medium.

BRIEF DESCRIPTION OF DRAWINGS

Embodiments of the invention are described below in more detail, by way of example, with reference to the accompanying drawings in which.

DETAILED DESCRIPTION OF EMBODIMENTS

Overview of Automatic Speech Recognition

Figure 1:
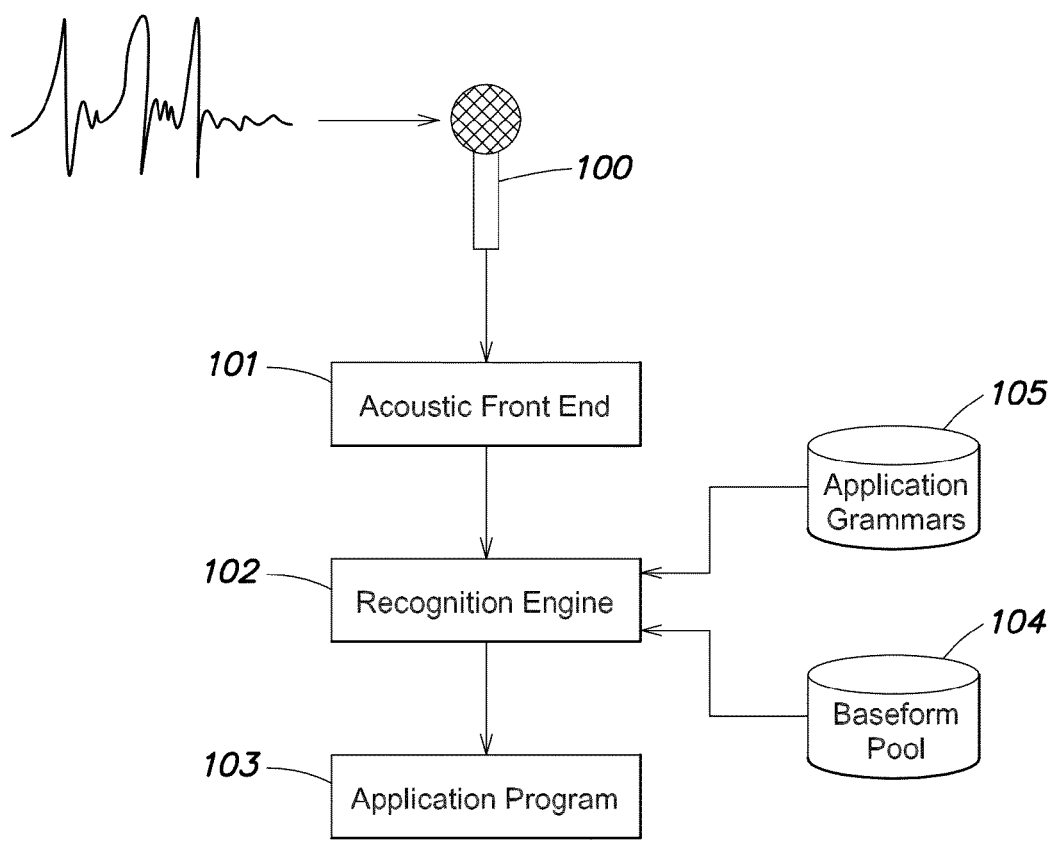
FIG. 1 is a schematic representation of an automatic speech recognition system, such as is known in the art.

An automatic speech recognition (ASR) system as shown in FIG. 1 comprises an input device 100, such as a conventional microphone or telephone handset, an acoustic front end (AFE) 101 receiving inputs from the input device, a speech recognition engine 102 receiving inputs from the AFE, and a speech-responsive application program 103 that interfaces to the speech recognition engine. The application 103 defines a set of logical steps to be executed as part of the interaction between the user and the ASR system. The application 103 typically identifies to the user what input is required via user prompts. The user prompts may be text strings displayed on a screen or audio segments played to the user. The speech-responsive application uses the results of the speech recognition engine to perform actions based on the inputs.

For a simple illustration, the following description relates to a possible account balance enquiry application. A user must input their account number and the ASR system is required to retrieve the relevant information (the account balance) from a database. The sequence of events within the interaction between the caller and ASR system may be represented as follows:
1. A caller accesses an ASR system to request a service;
2. The ASR system prompts the caller to input an account number ("Please say your account number");
3. The caller speaks the account number ("12345");
4. The ASR system takes the audio input from the previous step, and uses a recognition engine to convert to text;
5. The ASR system echoes back the recognised account number and seeks confirmation ("You said 12345. If this is correct, please say Yes. If this is not correct, please say No.");
6. The caller confirms ("Yes" in this case);
7. The ASR system accesses a database using the account number 12345 and retrieves the account balance;
8. The ASR system outputs the retrieved information to the caller ("The account balance for account 12345 is £100 credit").

To output information, as in steps 2, 5 and 8, the ASR system may have pre-recorded audio segments or may use text-to-speech synthesis. For the user input in steps 3 and 6, the machine uses a recognition engine, with grammars comprising possible input numbers and yes/no confirmation words. These grammars contain all the possible inputs that were envisaged by the application developer as likely responses to the prompts. The numbers grammar in this example will therefore contain all the digits from 0 to 9 inclusive, to allow the user to say any of those digits in any order. The yes/no confirmation grammar will typically contain not only "yes" and "no", but also variants such as "yep", "yeah", "OK", "correct", "right", "nah", "nope", and so on, together with optional items such as "please" and "thank you". In some implementations, it is possible to 'weight' specific terms manually. This means that one or more items can be marked as more likely over and against others within the grammar so that they will be preferred as recognition results.

Referring again to FIG. 1, the input device 100 is responsible for capturing an audio signal and converting the signal to a digital signal for machine processing. The input device 100 may be remote from the other components of the ASR system. The digitised signal received from the input device 100 is presented to the acoustic front end (AFE) 101 of the ASR system. The AFE is responsible for:
1. pre-processing the audio signal to remove noise;
2. establishing which part of the audio signal contains valid speech; and
3. parameterizing successive sections of the signal to be matched by the recognizer.

For the parameterization, the AFE extracts a section of the signal (for example, a 100 msec time slice), applies a Hamming window and generates a smoothed spectral representation (an array of numbers defining a polynomial representation of the section). This array of numbers is passed to the recognition process of the recognition engine, which processes the array according to the acoustic model (AM). The AFE then returns to extract the next, possibly overlapping, section from the signal and repeats the described steps until the complete audio signal has been processed.

As is known in conventional recognition engines of ASR systems, the recognition engine 102 receives inputs from the acoustic front end (AFE) 101 and processes the inputs—applying an acoustic model (AM) with reference to an application grammar 105 and an associated baseform pool 104. The application grammar 105 is typically an application-specific 'mini-dictionary' and 'phrase book' and includes words that the application developer thought users may use as inputs to the speech-enabled application. In theory, the application grammar could be a complete dictionary of a language, including common variations, but most applications require real-time responses and so limited-size application grammars are currently the norm. The baseform pool 105 comprises a pronunciation dictionary in the form of a repository of known pronunciations of phones (small identifiable units of sound) that may be included in an input word or phrase within the application grammar.

The recognition engine attempts to match sounds within the input audio signal against phones within the acoustic model, to identify a likely 'path' between phones (that is, a sequence of states and state transitions within the acoustic model) corresponding to the sounds of the input audio signal. Each phone is mapped to a set of states and transitions between states of the acoustic model, and each path comprises one or more phones.

Figure 2A:
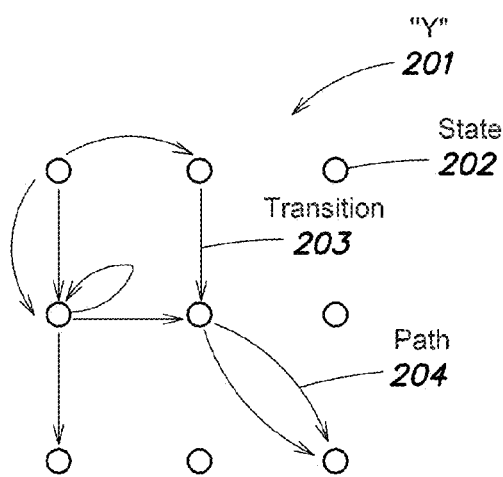
FIGS. 2A and 2B represent paths through states and state transitions of an acoustic model.
Figure 2B:
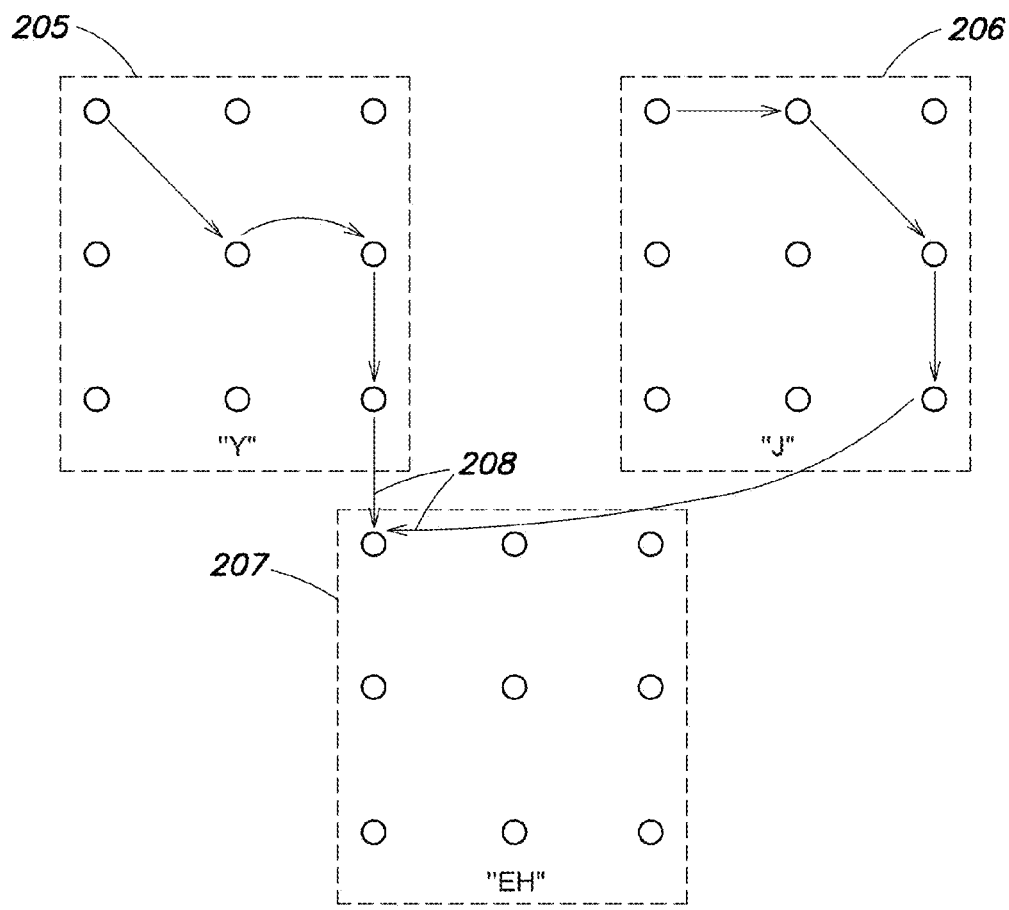

The acoustic model is typically a Hidden Markov Model (HMM), although other techniques are known. FIG. 2 is a simplified representation of some paths within a Hidden Markov Model. Each sound in the language can be represented as a path between states of the model, although there may be several paths that are each candidates for representing the same sound. Each state is a multi-dimensional Gaussian probability distribution, where the number of dimensions is fixed and relates to the number of terms used to describe the polynomial from the AFE processing. Transitions between states (including a "zero transition" to the same state) are also Gaussian probability distributions which refer to the likelihood that the current state could have been reached from the previous state. The recognition processing is described in more detail below, with reference to FIGS. 2A and 2B.

The simplified path shown in FIG. 2A represents the beginning, middle and end of a single sound, say "Y" 201 as in the word "yes". As successive sections from the AFE 101 are received at the recognition engine 102, they are compared to each of the states 202 with a view to identifying the state that is the most likely matching state for the respective section. If a good match is found at the current state, then the zero transition probability is queried. If a different state is a good match, then the transition probability between the current and next states is queried. As sections of the audio input are processed in turn, a "path" 204 is traversed through the HMM. As the path progressively passes through states 202 and transitions 203, a cumulative probability is calculated for the path. In practice, there will rarely be a single path. Multiple paths therefore can be found through the HMM for the same audio signal. If multiple candidate paths are considered, individual paths can be abandoned ("pruned") if the cumulative probability falls below a preset threshold. At the last state in the HMM or section of the HMM, the remaining paths (those not yet "pruned") are verified in reverse as a final check.

FIG. 2B is a simplified representation of moving from one phone label to the next, via two alternative paths. A successful path which relates to the phone "Y" 205 in "yes" competes with the alternative path for the phone "J" 206 in "jelly", because the input audio signal could be matched successfully to either of the alternatives. These two possibilities, "Y" and "J", are both retained for now. Let us assume that, as the signal continues to be processed, the next section of the input signal appears likely to be identified as the phone "EH" in "yes" or "jelly" 207. Then the transitions 208 from the previous sections of path traversed are checked. At this point, it would be possible on acoustic grounds alone to abandon one of the candidate phones 205 or 206 if the relevant transition probability was low.

Once the end of signal is reached, and there are no more audio sections from the AFE, then the best match path or paths are returned, along with the cumulative probability calculated as the paths were traversed. The paths represent a potential sequence of phones. Returning to FIG. 1, the recognition engine 102 uses two additional inputs to process the audio signal: the application-specific grammar 105 and the pronunciation dictionary 104 referred to herein as the baseform pool 104.

In a typical phone-based recogniser, the AM contains states and transitions which relate to parts (such as beginning, middle and end) of all sounds for a given natural language. The Gaussian distributions are 'trained' on audio data covering all possible sounds in all possible combinations for as many speakers as possible. This training step, for example, may include collating and summarising; the observed variations of the phone "Y" across all speakers who took part in the training set, and across all contexts represented in the training set.

Theoretically, therefore, the recognition engine can recognise any valid sequence of sounds for that language. Because this could lead to a proliferation of paths, an application specific grammar and associated baseform pool are defined to speed and support recognition. Entries in the grammar are used to identify and therefore limit the words that will be recognised. The use of domain and application-specific grammars is common, although it is possible to have a general and complex grammar for the natural language. The grammar as defined earlier contains all the allowable words and phrases for a given application (i.e. words and phrases that the application will treat as meaningful inputs). For a banking application (such as the example given previously), the allowable words and phrases may be limited to digits and yes/no variants and so the application grammar does not contain other words such as proper names or literary terms. Once the grammar has been defined for the application, a baseform pool is generated during compilation which represents all possible pronunciations for the words in the grammar. These pronunciations—the baseforms—are the set of valid sound sequences that may be matched. As mentioned above, the entries in the grammar comprise the set of words that will be recognised. For example, if the grammar contains only the words "Yes", "No" and "Correct", then only those words can produce a positive result. Entries in the baseform pool define the paths that can potentially be traversed in the acoustic model. For each word in the grammar, paths are retrieved from the baseform pool to constrain the number of paths which will be maintained from the matching step. Therefore, the grammar and baseform pool are used cooperatively to limit the overall search space within the AM. At runtime, they are used to restrict and/or "prune" paths through states of the AM.

Once the candidate path or paths has been returned from the AM, the paths are checked against the grammar. If the sequence is represented by a word or words in the grammar, the sequence of phones and the matching word or words are returned as the result. In a first example, a single result is returned as the input audio is recognised as including the path Y-EH-S with a confidence score derived from the cumulative probability calculated for the path (for example a probability of 0.60, referred to herein as a confidence score of 60%). The single result includes the orthographically correct version 'Yes', as well as the baseforms Y, EH, S arranged in order, and the confidence score. Alternatively, if the grammar contains a number of words that are potential matches to the input sounds, an N-best list may be returned such as in the following example (which is merely illustrative):

| Y-EH-S | 60% | Yes |
| Y-EH-L-OW | 20% | Yellow |
| Y-OH-TD | 15% | Yacht |
| J-EH-L-IY | 3% | Jelly |
| N-OW | 2% | No |

The above list includes the best and N−1 closest matches to sounds extracted from the input audio signal, which are found by applying the AM using sounds and words defined in the baseform pool and grammar. Typically, the baseforms, the orthographically correct version of the respective matching word and the associated confidence scores are returned within each result.

Thus, the recognition engine calculates a confidence score associated with each identified candidate path—based on the closeness of the acoustic match and possibly also the speech context. The recognition engine either identifies a single word in the application grammar corresponding to the path having the highest confidence score among the identified paths, or records the confidence scores for a set of paths. Regardless of whether a single result or multiple results (a so-called 'N-best list') are returned, the application can use the confidence scores to determine whether or not to accept the result. For example, a high confidence score may be considered to justify accepting the result without a separate confirmation step, and a low score may be responded to by looping back and re-requesting input from the user or requesting confirmation of an identified match.

Automatic Speech Recognition System with Adaptive Generation of Prompts

Figure 3:
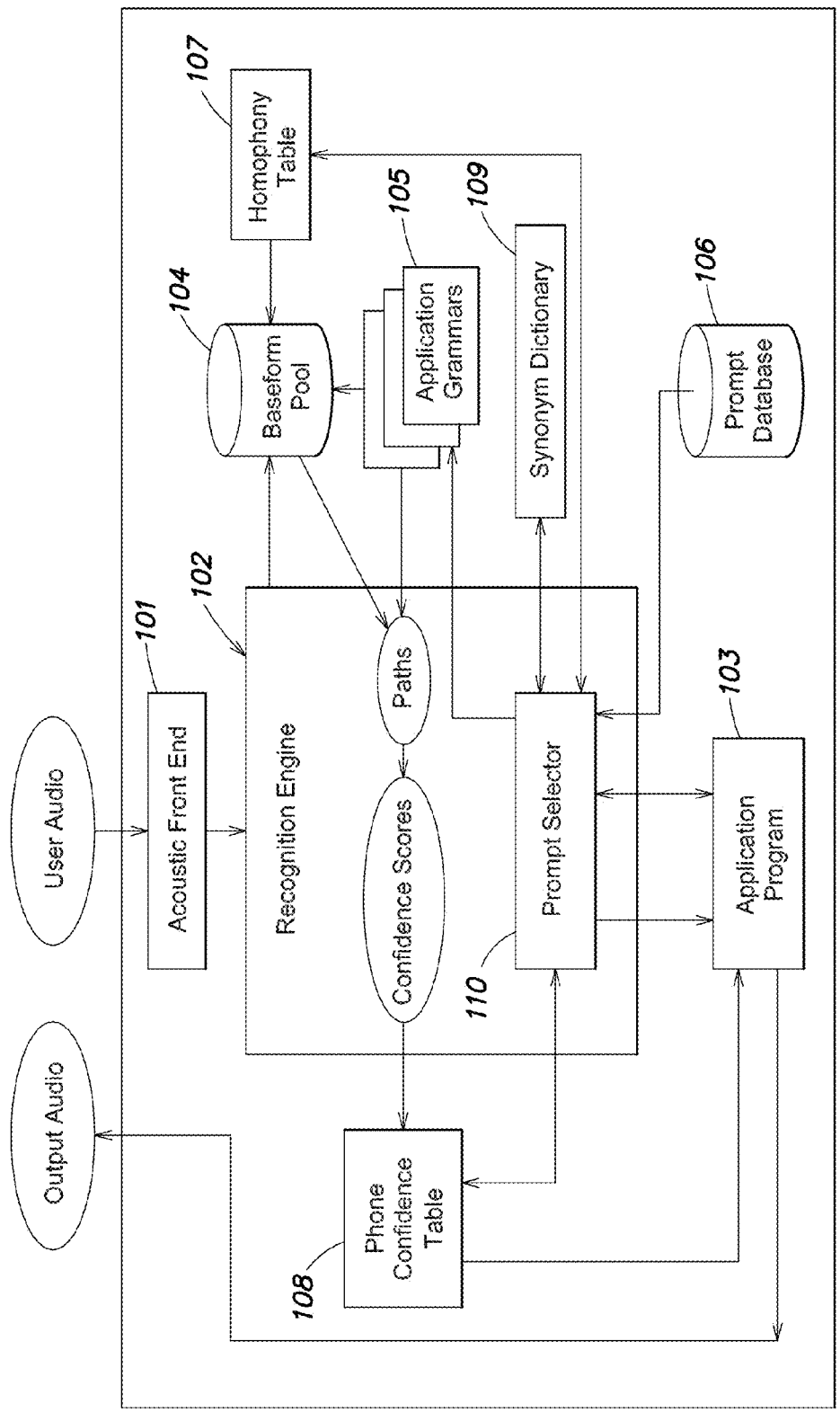
FIG. 3 is a schematic representation of an automatic speech recognition system according to an embodiment of the invention.

Described below with reference to FIG. 3 is an ASR system in which recognition confidence scores are calculated by the recognition engine 102 for candidate matching phones of a first user input. The recognition confidence scores are used to control selection of a subsequent user prompt, which is associated with a subsequent step within the user's interaction with the ASR program. The invention also enables updating of an application grammar and an acoustic model as a consequence of replacing a user prompt that resulted in low confidence recognition scores. For example, if 'Yes' is associated with a low confidence score, the word 'Yes' may be replaced by 'Yes please' and the gammar modified accordingly. The calculated recognition confidence scores can show which input sounds were not recognized with high confidence. Different embodiments of the present invention make use of this information in different ways, as described below.

In a first ASR program implementation of the invention, the recognition engine uses phone-specific recognition confidence scores to identify phones that appear to require additional recognition training. When generating a user prompt for a subsequent user interaction step with the speech-responsive application, the ASR program generates a prompt that invites input of words containing the phones for which additional training was determined to be required.

In an alternative implementation, the ASR program generates a prompt that is expected to avoid or reduce potential confusion by encouraging input of words other than those identified as low confidence matches.

The application grammar may be dynamically modified in response to the selection or customization of user prompts, as explained below, although the application developer may include potential replacement words within the grammar from the outset.

FIG. 3 shows the components of an automatic speech recognition (ASR) system according to an embodiment of the invention. As in the example of FIG. 1, the ASR system of FIG. 3 includes an acoustic front end (AFE) 101 and a recognition engine (RE) 102 referring to the application grammar 105 and baseform pool 104. The ASR system of FIG. 3 also has additional components not found in the known ASR system of FIG. 1, including a modified prompt database 106 and other components described below. Known ASR systems store audio files or text that are used to present results to a user or to indicate that input is required. The prompt database 106 also contains indicators of potential confusability and how they should be handled, as described below. The prompt database 106 is accessed by the application 103 to select user prompts automatically (selecting complete prompts or words for inclusion within user prompts). Use of the prompt database 106 is described in more detail below with reference to FIGS. 4 and 5.

In existing complex Natural Language systems, part of a Dialogue Manager's job is to select appropriate prompts and the present invention could be implemented such that the recognition engine 102 selects user prompts.

When developing the speech-responsive application, the grammar 105 is coded by the developer and the baseform pool 104 is derived from the specific application grammar. The process of deriving the baseforms or pronunciations is dependent on processing the results from training data. A homophony table 107 (a table of words that are spelt differently from each other but are pronounced the same and are therefore likely to be confused) is also generated as described below:

1. based on the raw AM, a Euclidean distance measure is calculated for each and every phone by comparison to each and every other phone. Thus, for Y, there will be a data array including a multiplicity of entries that show how close in acoustic terms Y is to every other phone. These are the raw confusability indices: a high score (greater distance) would mean the two phones are unlikely to be confused (for example 'O' and 'B'); a low score (smaller distance) would mean that the two phones are acoustically similar and therefore potentially confusable (for example 'P' and 'B', or 'S' and 'F').

The following illustrates a first exemplary method for calculating the Euclidean distance between states x of two different sounds z and y. Let $x_{az1}$ represent the mean value of the first parameter of state a for sound z, and $x_{ay1}$ represent the mean for the first parameter of state a sound y. The Euclidean distance between them is defined as: $\sqrt{(x_{az1}-x_{ay1})^2}$. For a multidimensional Gaussian distribution as in the HMM network of a typical recognition engine 102, this calculation is performed for x from 1 to M, where M represents the number of states used to represent a given sound. The Euclidean distance per state is now given by: $\sqrt{\Sigma(x_{azc}-x_{ayc})^2}$ where c is from 1 to N, where N represents the number of states used.

Knowing the variance around the mean, and the orientation of a vector between the two means, allows an extension and better confusion indicator. Extending the approach approve, the preferred distance measure is given by: $\sqrt{\Sigma((x_{azc}\pm\sigma_{azc})-(x_{ayc}\pm\sigma_{ayc}^2))^2}$ 2. in addition, a 'phone confusability index' is calculated for each phone, for example as the average of the confusability indices below a given threshold for each phone of a phone path. This phone confusability index is referred to herein as the inherent confusability measure for the phone.

3. taking the application-specific baseform pool (a database of phone paths relevant to the application grammar), the raw confusability indices are used to calculate, for each word of the application grammar, a cumulative confusability index representing how confusable two or more words are likely to be. The cumulative confusability index for pairs of words is stored in the homophony table 107.

At this stage, it would be possible to highlight likely confusions and change the application grammar and associated application prompts before deployment, such that the above-mentioned cumulative confusability indices between words are optimised. However, the ASR system described here defers the step of highlighting likely confusions until speech is analyzed at runtime, so that the inherent confusability between words in the application grammar can be correlated with runtime recognition confidence scores. The components and runtime operations of the ASR system are described in more detail below with reference to FIGS. 3, 4 and 5.

Figure 4:
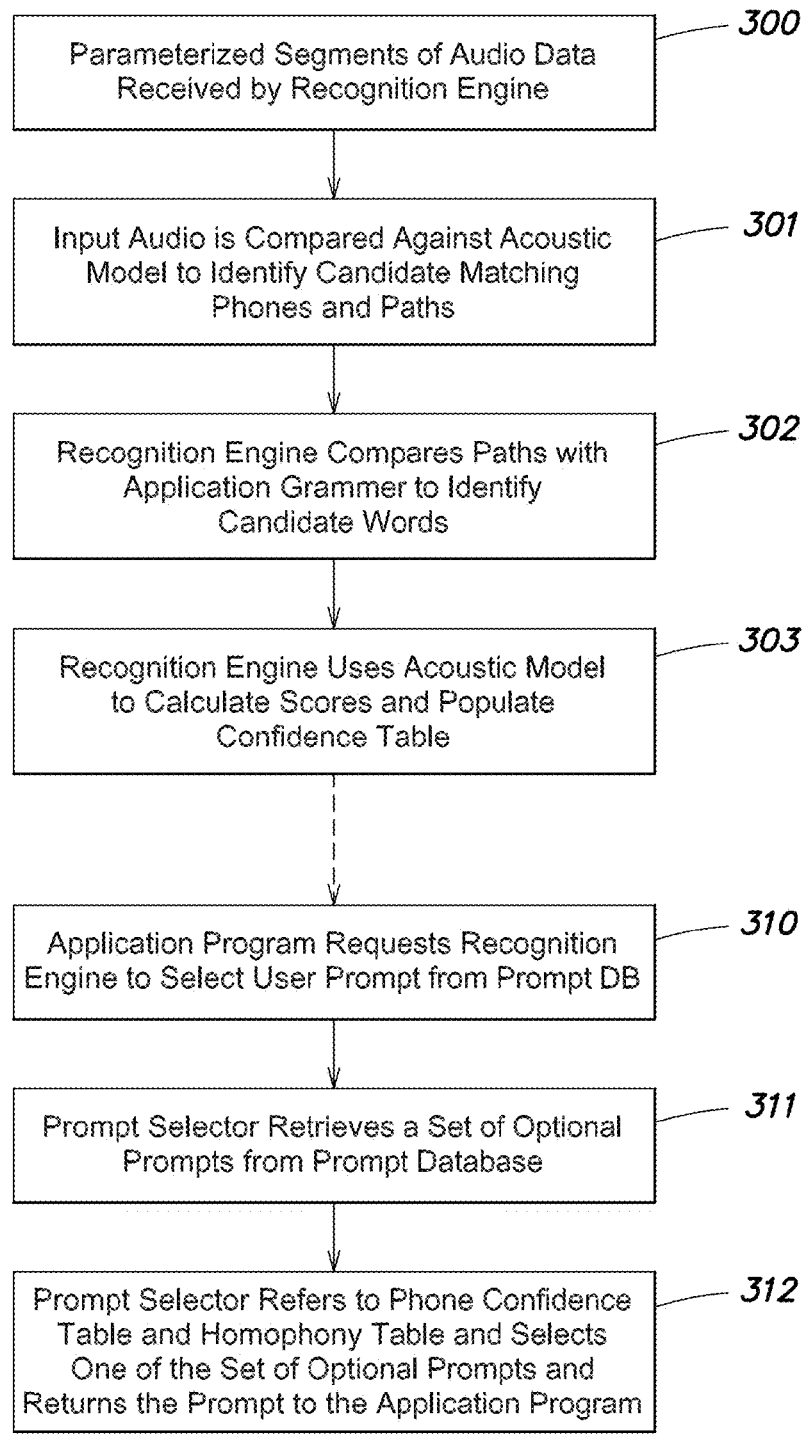
FIGS. 4 and 5 show the steps of two methods according to example embodiments of the invention.

Since the operations of an input device and an acoustic front end of an automatic speech recognition system are well known in the art (and the AFE is described above), the sequence of method steps shown in FIG. 4 begins with receipt 300 of pre-processed, parameterized segments of audio data by the recognition engine 102. The recognition engine 102 compares 301 the input audio segments against the acoustic model to identify candidate matching phones (sequences of states within the model) and sequences of candidate phones (referred to as 'paths' within the acoustic model) that are possible representations of the sounds spoken by a user. The recognition engine then compares 302 the candidate paths with the application grammar 105 in an attempt to identify words in the grammar that match the sounds spoken by the user. The recognition engine 102 uses the closeness of input audio to the mean of the probability distributions associated with individual phones of the acoustic model for each candidate path to calculate 303 confidence scores for each candidate matching phone and word.

As recognition attempts are made, for each separate phone in the matched path or paths, the confidence scores are collected 303 in a phone confidence table 108. The phone confidence table 108 contains the phones recognised, the associated confidence scores, the inherent confusability measure for each phone, and a cumulative confusability index for each word recognised. These will be used to evaluate the result as described below. In addition, as measurements are repeated over a period of time, the trend of these measures for individual phones is stored in a confidence trend database, also explained below but not shown in the figures.

In evaluating the results as described below, the confusability indices calculated separately and the runtime values for the specific application and specific user are all retained—so that the generalised confusion measures can be modified dynamically to the real deployment environment.

As a word recognition result becomes available, inherent confusability entries from the phone confidence table are applied to the calculated recognition confidence values for a word, to provide an additional result field together with the path (the baseform) and per-phone confidence scores. This additional result field is referred to herein as the runtime confusion measure. In one implementation, the recognition confidence score calculated at 10, runtime (when the recognition engine is activated) is multiplied with the inherent phone confusability indices calculated in advance. In this way, the confidence value will reduce in proportion to the inherent (i.e. language-general) and cumulative (ie. application-specific) indices if the latter two values indicate a high degree of confusability.

The following example is provided for illustrative purposes:

let (a) be the confidence score for a specific recognition attempt (for example 70%); and let (b) be the inherent confusability for all the sounds in the result by comparison to the other sounds in the acoustic model (for example 25%, if the sounds in the result are highly confusable).

Additionally, let (c) be the cumulative confusability for the specific word or words in the result, by comparison with all other words in the grammar (for example a value of 80% if we predict that this word or these words are not easily confused with the other words in the grammar, even though individual sounds might be confusable).

Values (b) and (c) have been calculated offline. Multiplying them together, we get 20%.

Multiplying the confidence score (a) with this 20% result, gives a runtime confidence measure of 14%.

If the inherent confusability was higher (say 0.75), then the runtime confusion measure would also have been higher (0.42 in this example). Alternatively, if the cumulative confusability index were lower (say 0.50), then the runtime confusion measure would have come out lower (in this case 0.0875). The range of possible values, therefore, need not be linearly related. However, a low runtime confusion measure nevertheless implies that the result will lead to potential confusions and misrecognitions.

As described above, three values are calculated and used when evaluating recognition confidence and likely confusions: a per-speaker, environment-specific run-time recognition confidence; an inherent per-phone confusability; and a cumulative confusability index for a word. Each of these values represents different influences on recognition. The confidence score represents how the recognition engine is performing under the current conditions for the current speaker. The inherent per-phone confusability index represents how distinct the sound or sounds are that are being pronounced (in the particular language). The cumulative confusability index represents how important inherent confusability is for this specific application. The system is optimized if, all else being equal, the cumulative confusability index is as high as possible.

The runtime confusion measure that combines the inherent confusability values and the run-time confidence is used by the speech-responsive application in one of the ways described below.

Targetted Training for Low Confidence Phones

In a first embodiment, user input prompts are adapted to try to elicit user inputs that include phones that were previously recognized with low recognition confidence. A number of optional user prompts are stored in a prompt database 106 and are associated with an application program. The optional prompts are each selectable by a prompt selector 110, implemented within the recognition engine in this example embodiment, based on received user inputs and calculated recognition confidence values. Stored together with at least some user prompts are pointers to phones within the baseform pool 104, which phones are expected to be included within the words spoken by a user in response to the respective prompt. When a phone is identified as having a low runtime confusion measure, subsequent selection of user prompts by the prompt selector (during interaction between the ASR system and the current caller) favours prompts that are stored with pointers to that phone in the baseform pool. This encourages the user to input the phone again, enabling targetted recognition training within a productive conversation between a caller and ASR system.

Let us assume that a conversation is in progress between a user and an ASR system, and the application program is performing operations in response to the user's input speech. Instead of the application program 103 always generating user prompts independently (as in many known systems), the application program responds to certain user inputs by invoking 310 a prompt selector process 110 in response to results output by the recognition engine 102 (or the prompt selector may be implemented within the recognition engine 102). The prompt selector refers to the prompt database 106 to identify 311 a set of optional user prompts from which to select the next user prompt. The prompt selector also refers to the phone confidence table 108 to identify phones previously recognised with low confidence that are relevant to the set of optional user prompts, and refers to the homophony table to identify any words that could cause confusion issues. The prompt selector then selects 312 a user prompt that is expected to encourage input of one or more phones previously recognized with low confidence. The selected prompt is then returned to the application. The input can now be used in one of two ways: either used directly in a recognition engine which supports adaptation to provide real-time training data, or separately recorded with the associated recognition result for offline processing. In either case, the expectation is that over time the additional training data would help increase recognition success and therefore the runtime confidence measure would increase.

The targetted recognition training is most effective if a user is prompted to input a word or phrase that includes at least one high recognition confidence phone and the low recognition confidence phone or phones that require training. Any additional prompted inputs (such as prompted inputs of 'Yes please' instead of 'Yes') will aid recognition training because there are more data to analyze. The selection from a set of optional user prompts may comprise selecting a word or phrase that the user is invited to say in response to a question, and the selected word or phrase is used to generate a user-specific customized dialogue. For example, a standard question asked by an ASR system may be "If you wish to know opening times, say <PHRASE>", and the optional user prompts held in the prompt database may be phrases such as 'Yes', 'Yes please', 'Correct', 'Opening times', etc. The Prompt selector may select 'Yes please' in response to a previous recognition of 'Yes' with a low recognition score, since this will allow targetted recognition training for the phones within the word 'Yes'. Because both the sounds which previously produced high recognition confidence are known, it is more likely that the recognition engine will return a successful result to the current application. Secondly, because both those sounds and the ones which produce low scores are known, it is easier to identify which parts of the audio input are needed for training purposes.

Replacement of Low Confidence Phones

Figure 5:
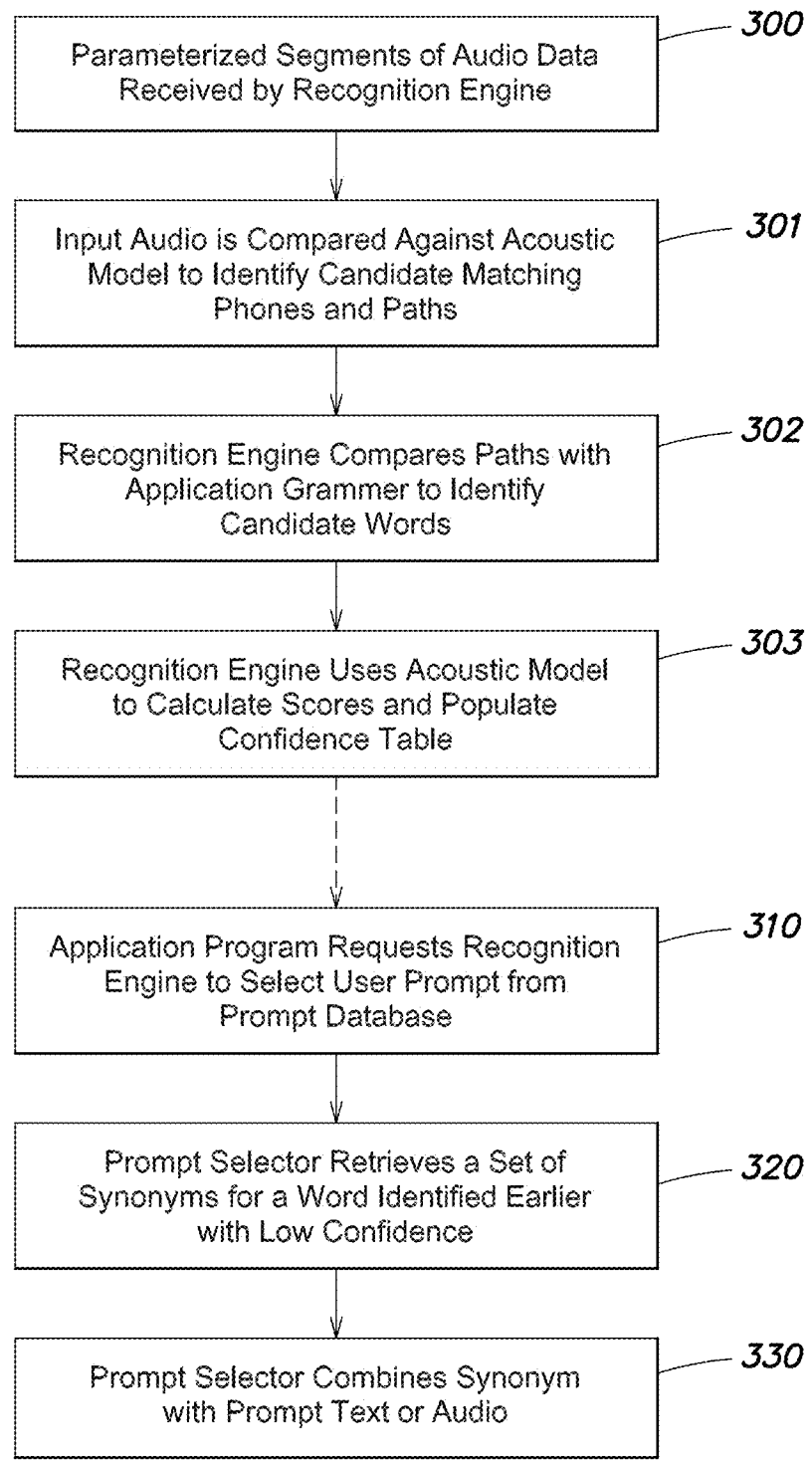

In a second embodiment, represented in FIG. 5, words containing inherently confusable phones and therefore having a low runtime confusion measure are replaced. Having identified a low runtime confusion measure, a synonym dictionary 109 is queried 320 to find possible synonyms for the word or phrase which is confusable. The synonym dictionary contains words for replacing a word that includes a low confidence phone, which replacement word can be added to the grammar 105 if not already included and can be weighted to be more likely than the original term. When generating a subsequent user prompt, the replacement words are combined 330 with an associated prompt text or audio file to generate a user prompt that is expected to encourage input of the replacement term. Thus, a replacement synonym is added to a prompt text or audio file to generate a modified user prompt. The prompt database 106 can be updated if required.

By way of example, the following description relates to the yes/no confirmation example above. An original application prompt includes the words:

" . . . If you wish to hear our opening times, please say 'Yes'. Otherwise, please say 'No'".

If the term Yes is returned with a low runtime confusion measure, then an alternative such as 'Correct' is retrieved from the synonym dictionary 109 and used to modify the prompt so that the modified prompt includes the wording " . . . please say 'Correct' . . . . ". The word Correct may also be added to the grammar 105 if required and weighted above the original term Yes; and the new prompt wording may be stored in the prompt database 106.

In future interactions between the caller and the ASR program in the above example, when the application reaches the yes/no confirmation step, the user is prompted with " . . . say Correct" and will more likely respond with this prompted term rather than "Yes", thus reducing the likelihood of misrecognition.

Periodically, the confidence trend database mentioned above is also updated. This confidence trend database can be periodically queried to highlight phones in whatever context which are leading to lower recognition success rates. As a result, dynamic adaptation can be triggered in the AM. Adaptation, as known in the prior art, involves capturing runtime acoustic data and not only processing as normal (see FIG. 1 and the description above), but additionally weighting the Gaussian distributions ('retraining') using the runtime acoustic data. This can achieve improved matching over time, but the process is 'blind' in the sense that it is used irrespective of where issues may arise in sections of the HMM. In the system described herein, actual performance information is captured and this could trigger adaptation in a more targetted manner. In addition to dynamic adaptation of user prompts, the performance information could be used in one embodiment to generate a separate retraining report for the system administrator to review and address as required.

Figure 6:
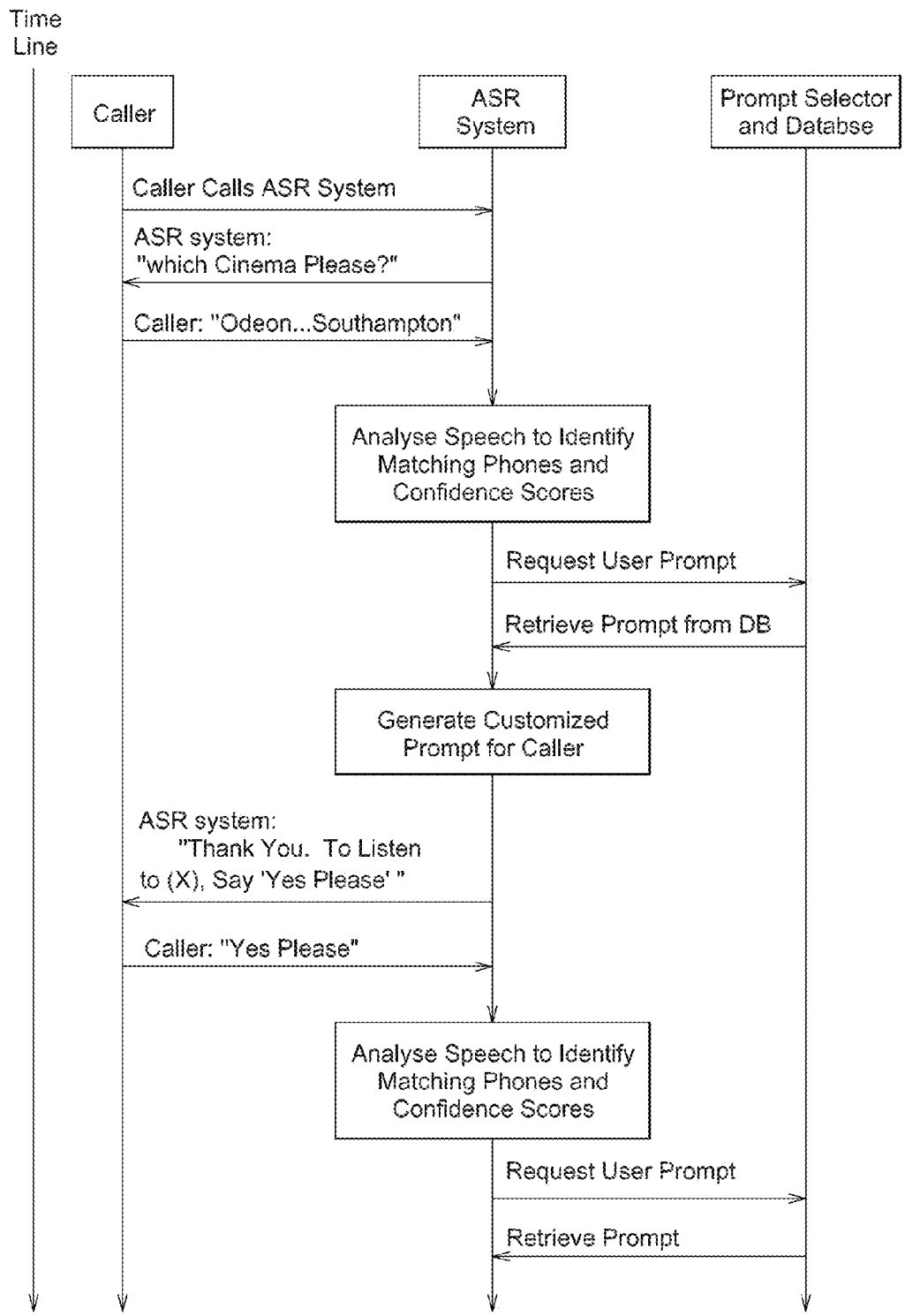
FIG. 6 shows an extract from an example conversation between a caller and an automatic speech recognition system according to an embodiment of the invention.

FIG. 6 shows interactions between a caller and an ASR system. The ASR system includes a prompt selector and a user prompt database storing replacement user prompts. A timeline is shown on the left of FIG. 6. The interaction begins with a caller ringing a telephone number of the ASR system to determine information relating to films showing at a cinema. In the example described here, the ASR system responds to the caller by asking "Which cinema please?". The caller responds by identifying a cinema, for example "The Odeon in Southampton". The ASR system then analyzes the spoken input to identify possible matching phones and words, and to determine recognition confidence scores from the cumulative probability for matched paths. Where recognition confidence scores are lower than a preset threshold, this recognition difficulty is responded to by selecting an alternative word or phrase from a prompt database.

In a first ASR system, if an input word or phrase is recognized with low confidence, subsequent generation of user prompts involves selecting a user prompt from a set of alternative user prompts with the selection being based on which user prompts are associated with phones identified as having low confidence recognition. The ASR system selects user prompts that are associated with low confidence, in order to make use of any additional opportunities for speech recognition training.

In an alternative ASR system implementing the invention, if an input word or phrase is recognized with low confidence, a subsequent user prompt which is likely to be responded to with the same input word or phrase is not used but is replaced by a user prompt that does not invite the same response. The replacement user prompt is selected in the expectation that the spoken response to this replacement user prompt will be recognizable with greater confidence than the problematic input speech. In this way, a customized dialogue is dynamically generated for the particular caller at a particular time and in a particular environment using the replacement prompt. In one example, replacement prompts invite a very specific response from callers (such as "Thank you. To listen to information on <X>, say 'YES PLEASE'"). The subsequent response from the caller may also be analyzed, a confidence score calculated and if necessary the confidence score may be used to influence subsequent generation of user prompts. The steps of adjusting subsequent user prompts in response to confidence scores associated with the recognition of user inputs can be repeated as many times as required, such as until the speech recognition program achieves a sufficient recognition confidence to permit more free-form inputs, or until the end of the conversation.

INDUSTRIAL APPLICABILITY AND ADVANTAGES

Automatic speech recognition systems are increasingly used in many industries to improve efficiency or productivity of workers, such as to save workers from mundane aspects of call handling and in some cases to reduce callers' waiting times. For example, an ASR system may perform functions that would otherwise require many personnel to handle incoming calls, including answering trivial questions that can be readily automated. An ASR system may implement menu selection operations to direct a caller to recorded information or to the correct person or department within an organisation.

As described above, confidence scores can show which areas of a language an automatic speech recognition system has most difficulty recognizing. Recognition problems and the evaluation of recognition confidence scores may be caller-specific, since certain user prompts may result in low confidence recognition for some specific callers only, or may be environment-specific in the sense that certain user inputs may be more prone to distortion in background noise, for example. Having evaluated recognition confidence scores, user prompts are adjusted to encourage the caller to use words that are expected to be recognized with higher confidence scores, or to provide a training opportunity within the context of a functional dialogue between the caller and the speech recognition system. Recognition confidence can then be improved with minimal inconvenience to callers, because the adjustment of user prompts and any retraining can be achieved without a dedicated recognition training period and potentially without requiring callers to repeat their inputs. Callers typically require that their telephone calls achieve a desired result very quickly, especially when speaking to an automatic speech recognition system.

The selection or customization of user prompts can be performed dynamically in response to evaluated recognition performance. A recognition grammar may be modified on the basis of performance, and the recognition engine's acoustic model may be optimised to improve future performance.

The consideration of known homophones can provide an additional check for use with the baseform pool to determine which sounds are inherently confusable. This is combined with actual measured phone confidence scores to identify prompts requiring modification.

In the illustrative embodiments described above, the prompt selector was described as a component of the recognition engine, with the application interfacing to the recognition engine to invoke functions of the prompt selector. In another embodiment, the prompt selector is implemented within a speech-responsive application program but refers to the recognition confidence table populated by the recognition engine. In other embodiments, the recognition engine and the prompt database can interface to a conventional speech-recognition application and the user prompt selection operations are performed transparently from the perspective of the application.

The invention claimed is:

1. A method for use with an automatic speech recognition (ASR) system, the ASR system comprising at least one model having a plurality of representations of phones, the method comprising acts of:
   receiving an audio signal comprising a first user input;
   analyzing the audio signal to identify at least one first phone as having a selected recognition performance characteristic, wherein the act of analyzing comprises comparing one or more sounds in the audio signal with a representation of the at least one first phone in the at least one model;
   subsequent to receiving and analyzing the audio signal comprising the first user input, selecting a user prompt to be presented to a user of a speech-responsive application to elicit a second user input, wherein the speech-responsive application is programmed to perform at least one action based on the second user input, and wherein the user prompt is selected based on a determination of whether the user is expected to speak, in response to the user prompt, the at least one first phone which is identified as having the selected recognition performance characteristic;
   causing the user prompt to be presented to the user of the speech-responsive application, wherein:
      the at least one first phone is associated with a first confidence score, the first confidence score being lower than a selected confidence threshold, and
      the user prompt is selected to invite the user to speak an input phrase that combines a first word with one or more second words, wherein the first word comprises the at least one first phone associated with the first confidence score that is lower than the selected confidence threshold, and the one or more second words comprise at least one second phone that is associated with a second confidence score, the second confidence score being higher than the selected confidence threshold; and
   performing, by the speech-responsive application, the at least one action based on the second user input.

2. The method of claim 1, further comprising:
   receiving speech from the user in response to the user prompt; and
   using the speech to train the at least one model.

3. The method of claim 1, wherein the user prompt prompts the user to speak one of a plurality of input phrases, and wherein the act of selecting the user prompt comprises selecting at least one input phrase of the plurality of input phrases based on a presence or absence of the identified at least one first phone in the at least one input phrase.

4. The method of claim 1, wherein the speech-responsive application is programmed to perform a plurality of actions, the plurality of actions comprising the at least one action, and wherein the method further comprises:
   selecting, based on the second user input, the at least one action from the plurality of actions.

5. The method of claim 1, further comprising audibly rendering the user prompt.

6. The method of claim 1, wherein the representation of the at least one first phone comprises a set of states and state transitions.

7. A system for controlling operation of an automatic speech recognition (ASR) system, the ASR system comprising at least one model having a plurality of representations of phones, the system comprising at least one computer programmed by executable code to:
receive an audio signal comprising a first user input;
analyze the audio signal to identify at least one first phone as having a selected recognition performance characteristic, wherein the at least one computer is programmed to analyze the audio signal at least in part by comparing one or more sounds in the audio signal with a representation of the at least one first phone in the at least one model;
subsequent to receiving and analyzing the audio signal comprising the first user input, select a user prompt to be presented to a user of a speech-responsive application to elicit a second user input, wherein the speech-responsive application is programmed to perform at least one action based on the second user input, and wherein the user prompt is selected based on a determination of whether the user is expected to speak, in response to the user prompt, the at least one first phone which is identified as having the selected recognition performance characteristic;
cause the user prompt to be presented to the user of the speech-responsive application, wherein:
the at least one first phone is associated with a first confidence score, the first confidence score being lower than a selected confidence threshold, and
the user prompt is selected to invite the user to speak an input phrase that combines a first word with one or more second words, wherein the first word comprises the at least one first phone associated with the first confidence score that is lower than the selected confidence threshold, and the one or more second words comprise at least one second phone that is associated with a second confidence score, the second confidence score being higher than the selected confidence threshold; and
perform, by the speech-responsive application, the at least one action based on the second user input.

8. The system of claim 7, wherein the at least one computer is further programmed to:
receive speech from the user in response to the user prompt; and
use the speech to train the at least one model.

9. The system of claim 7, wherein the user prompt prompts the user to speak one of a plurality of input phrases, and wherein the at least one computer is programmed to select the user prompt at least in part by selecting at least one input phrase of the plurality of input phrases based on a presence or absence of the identified at least one first phone in the at least one input phrase.

10. The method of claim 7, wherein the speech-responsive application is programmed to perform a plurality of actions, the plurality of actions comprising the at least one action, and wherein the at least one computer is further programmed to:
select, based on the second user input, the at least one action from the plurality of actions.

11. At least one computer-readable device having recorded thereon program code that, when executed, performs a method for use with an automatic speech recognition (ASR) system, the ASR system comprising at least one model having a plurality of representations of phones, the method comprising acts of:
receiving an audio signal comprising a first user input;
analyzing the audio signal to identify at least one first phone as having a selected recognition performance characteristic, wherein the act of analyzing comprises comparing one or more sounds in the audio signal with a representation of the at least one first phone in the at least one model;
subsequent to receiving and analyzing the audio signal comprising the first user input, selecting a user prompt to be presented to a user of a speech-responsive application to elicit a second user input, wherein the speech-responsive application is programmed to perform at least one action based on the second user input, and wherein the user prompt is selected based on a determination of whether the user is expected to speak, in response to the user prompt, the at least one first phone which is identified as having the selected recognition performance characteristic;
causing the user prompt to be presented to the user of the speech-responsive application, wherein:
the at least one first phone comprises at least one first phone that is associated with a first confidence score, the first confidence score being lower than a selected confidence threshold, and
the user prompt is selected to invite the user to speak an input phrase that combines a first word with one or more second words, wherein the first word comprises the at least one first phone associated with the first confidence score that is lower than the selected confidence threshold, and the one or more second words comprise at least one second phone that is associated with a second confidence score, the second confidence score being higher than the selected confidence threshold; and
performing, by the speech-responsive application, the at least one action based on the second user input.

12. The at least one computer-readable device of claim 11, further comprising:
receiving speech from the user in response to the user prompt; and
using the speech to train the at least one model.

13. The at least one computer-readable device of claim 11, wherein the user prompt prompts the user to speak one of a plurality of input phrases, and wherein the act of selecting the user prompt comprises selecting at least one input phrase of the plurality of input phrases based on a presence or absence of the identified at least one first phone in the at least one input phrase.

14. The at least one computer-readable device of claim 11, wherein the speech-responsive application is programmed to perform a plurality of actions, the plurality of actions comprising the at least one action, and wherein the method further comprises:
selecting, based on the second user input, the at least one action from the plurality of actions.

* * * * *